United States Patent [19]

Spenk et al.

[11] Patent Number: 4,955,304
[45] Date of Patent: Sep. 11, 1990

[54] REMOTE LOCOMOTIVE SPOTTER CONTROL

[75] Inventors: Robert E. Spenk, Des Plaines; Pesi A. Vazifdar, Bolingbrook; John A. Janowski, Jr., Western Springs, all of Ill.

[73] Assignee: General Motors Corporation, Detroit, Mich.

[21] Appl. No.: 357,131

[22] Filed: May 25, 1989

[51] Int. Cl.⁵ .............................................. B60L 15/42
[52] U.S. Cl. .................................. 104/296; 104/295; 246/187 A; 180/321
[58] Field of Search ........... 246/187 A, 187 B, 187 R, 246/186; 104/295, 296, 297, 302; 105/26.02; 180/167, 168, 321; 303/3, 15, 20

[56] References Cited

U.S. PATENT DOCUMENTS

| | | | |
|---|---|---|---|
| 1,907,974 | 5/1933 | Johnston | 246/187 A |
| 3,059,716 | 10/1962 | Iserman et al. | 180/321 |
| 3,218,456 | 11/1965 | Matthews | 246/187 A |
| 3,890,903 | 6/1975 | Showell | 104/295 |
| 4,678,981 | 7/1987 | Murray | 104/295 |
| 4,687,258 | 8/1987 | Astley | 303/3 |
| 4,846,581 | 7/1989 | Osterlund et al. | 180/321 |

FOREIGN PATENT DOCUMENTS 0163830  7/1987  Japan .................................. 180/321

OTHER PUBLICATIONS

"Remote Control for Trains", Electronics, Dec. 28, 1964, p. 114.

Primary Examiner—Robert P. Olszewski
Assistant Examiner—Mark T. Le
Attorney, Agent, or Firm—Robert J. Outland

[57] ABSTRACT

A remote locomotive spotter control having a plug in remote unit to control braking and battery power to one or more traction motors for moving the locomotive from an outside location. The control system provides automatic bell operation when the brakes are released and brake application whenever the remote brake control is released. Additional features prevent operation of the spotter control until the locomotive independent brake has been set and whenever the main reservoir pressure is too low for repeated brake application. Damage to the battery through inadvertent connection to the main generator is also prevented.

16 Claims, 3 Drawing Sheets

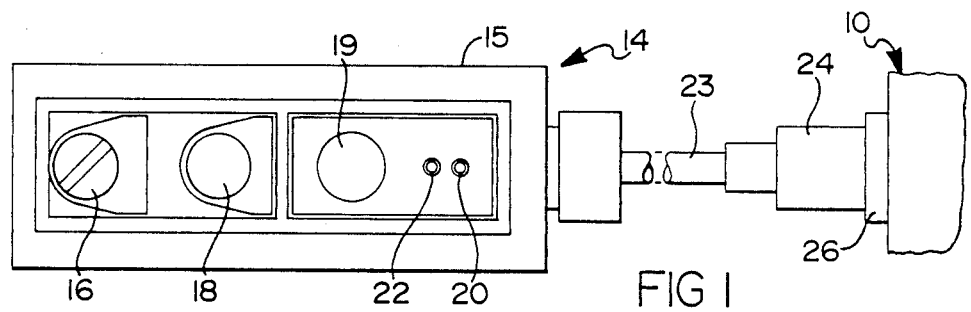
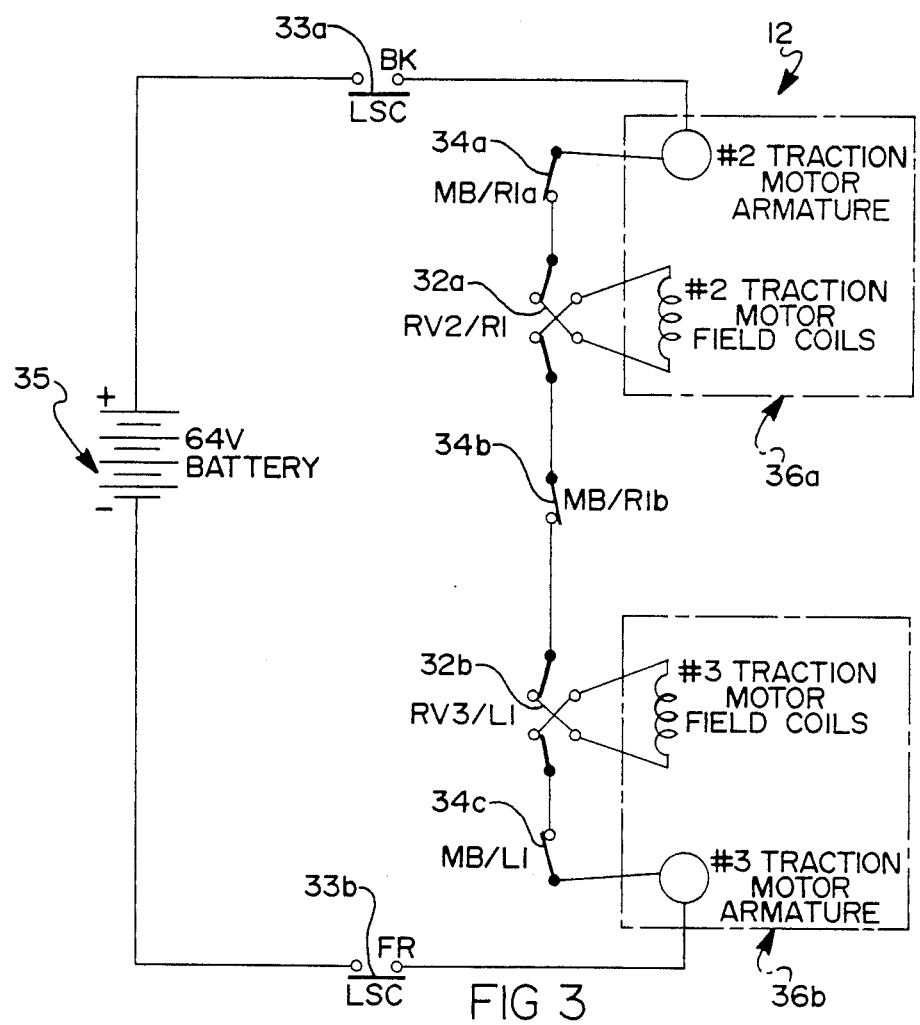

REMOTE LOCOMOTIVE SPOTTER CONTROL

TECHNICAL FIELD

This invention relates to remote spotter control systems for diesel-electric locomotives and other electrically driven tracked vehicles. In a preferred embodiment, the invention relates to a remote spotter control system for diesel-electric locomotives of the type made by the Electro-Motive Division (EMD) of General Motors and their worldwide associates.

BACKGROUND

During routine locomotive maintenance, it is often required to move (or spot) a locomotive within or outside of a railway maintenance facility or shop. In many cases, it is desirable to do this without operating the diesel engine or other power source usually used for driving the locomotive and to move the locomotive in another manner.

Spotter control systems are in use that are operated from the locomotive cab and drive the locomotive by applying voltage from the locomotive batteries across two of the locomotive traction motors to develop power. Braking is achieved by operation of the locomotive cab brake controls after the brake system has been charged with air pressure.

For various reasons, it may be more convenient and efficient to have the spotting operation controlled from a point outside the locomotive where, for example, a single person my be able to safely and efficiently move the locomotive to a new position.

SUMMARY OF THE INVENTION

The present invention provides a remote spotter control system which is connected with existing locomotive equipment and enables an operator to efficiently move a locomotive from an external position on the ground alongside the locomotive or otherwise outside of the locomotive cab. For operational safety, the system as applied provides for operator control of both power and brake functions with safety features that apply the brakes if the operator for any reason lets go of the spotter control unit. Interlocks may also be included to prevent external control if the cab controls are in use and vice versa.

A preferred embodiment includes a separate spotter brake and power control system that is permanently applied to the locomotive in addition to the standard locomotive brake and power control systems. The spotter system is operated by a portable remote control box that is plugged into a locomotive carbody mounted receptacle for operation of the spotter power and braking controls. The box is held by an operator who is preferably standing on the ground or platform alongside the locomotive. However, operation from an alternate location outside the cab of the locomotive could be provided for if desired.

Full control of the locomotive spotting movement is provided from the remote spotter control box, eliminating any requirement for personnel to be present in the cab of the locomotive during spotting movements. In the preferred embodiment, control of the following functions is provided from the locomotive control box:
  Locomotive independent brake;
  Warning bell;
  Battery power to two traction motors in series through control by a spotting contactor; and
  Directional control.

These and other features and advantages of the invention will be more fully understood from the following description of certain specific embodiments of the invention taken together with the accompanying drawings.

BRIEF DRAWING DESCRIPTION

In the drawings:

FIG. 1 is a top view of one form of a locomotive remote control box with attached cable and plug connected to a locomotive in accordance with the invention;

FIG. 3 is a simplified wiring diagram of a locomotive showing application of the spotting contactor thereto.

DETAILED DESCRIPTION

Figure 2:
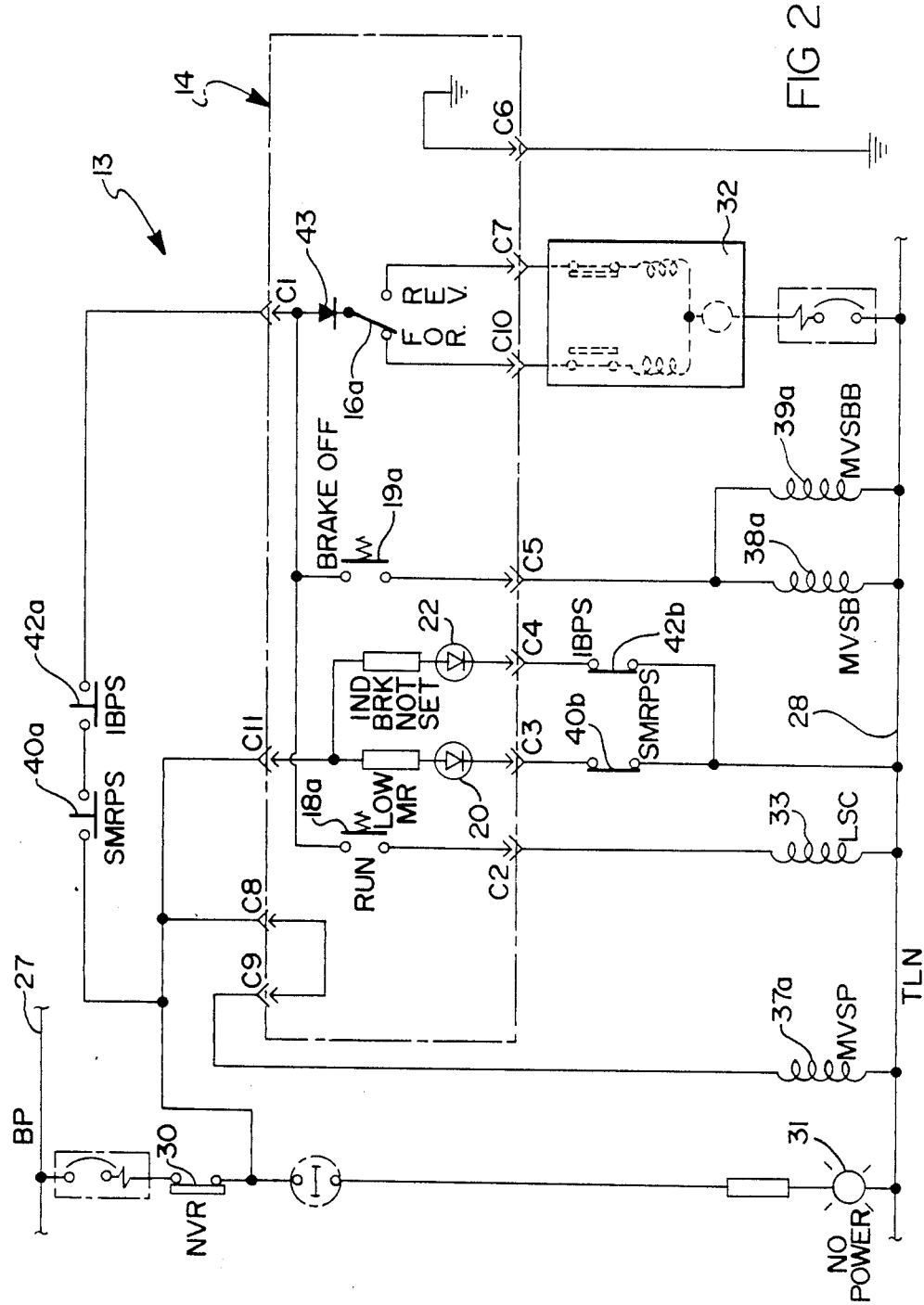
FIG. 2 is an electrical wiring diagram of the control portions of the spotter control system and remote box as applied to the electrical system of a locomotive.

Referring now to the drawings in detail, numeral 10 generally indicates an EMD diesel-electric locomotive to which has been applied a preferred embodiment of spotter control system according to the invention. Locomotive 10 is conventionally provided with a diesel engine drivingly connected with an electric generator (not shown) for generating power for traction. The locomotive further includes an air system 11 (FIG. 4), electric traction motor power system 12 (FIG. 3), and electric control system 13 (FIGS. 1 and 2), each of which has been modified to incorporate portions of the spotter control system and to connect with its detachable remote unit 14 (FIGS. 1 and 2) in accordance with the invention.

Electric Control System

As shown in FIG. 1, the remote unit 14 includes a hand held grounded electrical control box 15 sufficiently sturdy for railroad use. The box 15 has a control face on which are located a forward/reverse control 16, a run button 18, a brake off button 19, a pressure signal 20 and a brake signal 22. The box 15 is connected by a flexible cable 23 with a 12 prong plug 24 which in use is received in a receptacle 26. The receptacle is mounted in a suitable position on the locomotive carbody, such as on one or both sides toward the front and rear of the underframe, and is connected with other portions of the spotter electrical control system 13 on the locomotive 10.

Figure 4:
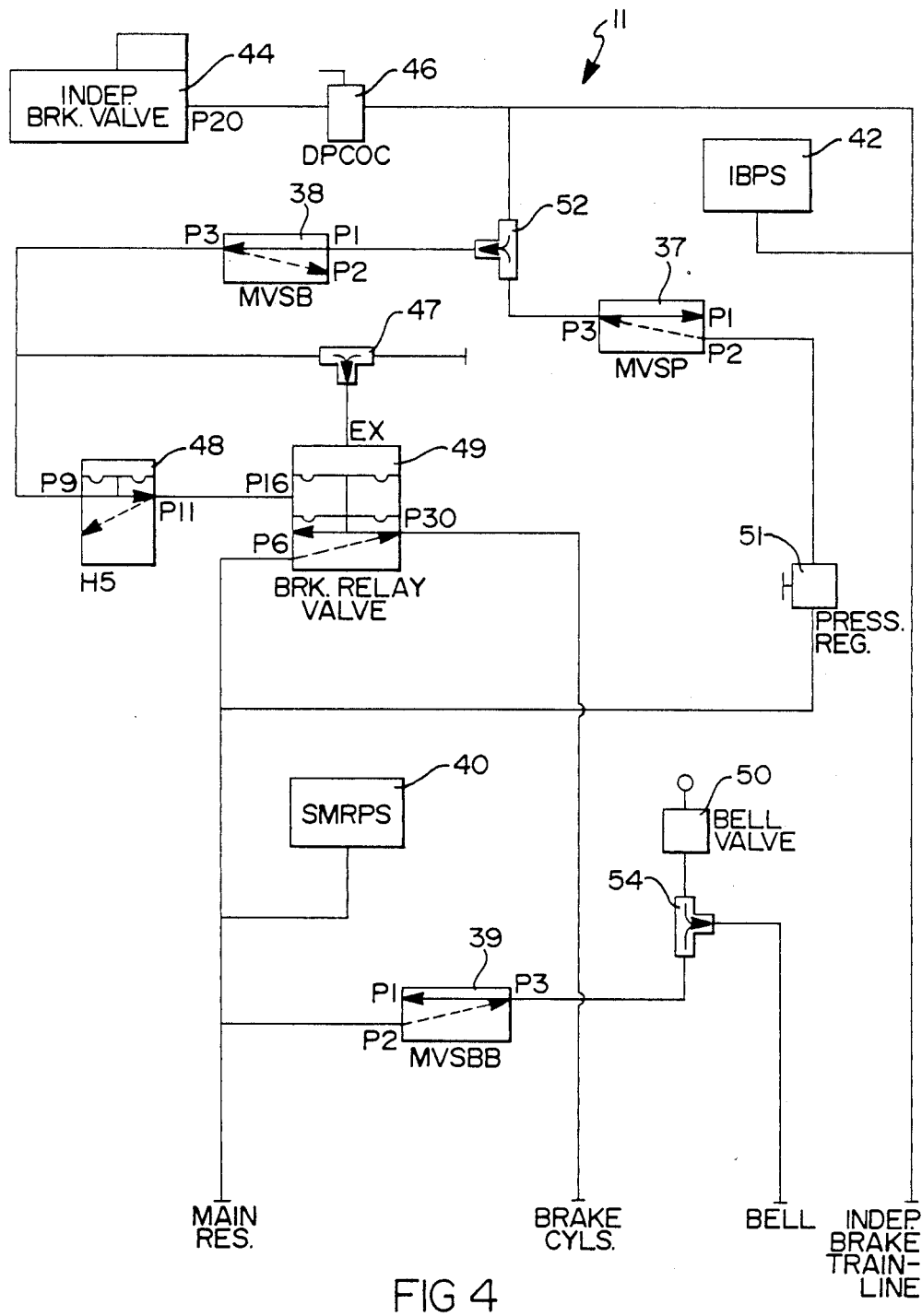
FIG. 4 is a diagram of portions of the locomotive air system showing integration therewith of the spotting system air control portions.

FIGS. 2, 3 and 4 respectively illustrate the interconnection of the spotter control system elements with the locomotive electric control system 13, traction motor power system 12 and air system 11. In FIG. 2, elements of the prior locomotive electric control system include the usual battery positive conductor 27 and the trainlined negative conductor 28 between which is connected an NVR interlock 30 and no-power light 31. The locomotive reverser 32 is also shown.

The portions within the dashed line 14 represent the remote unit 14 which is removable from the system by removal of the plug 24 from the receptacle 26. The connecting points numbered c1–c11 along line 14 represent the eleven active pins and sockets of the plug 24 and receptacle 26 which connect together on insertion of the remote unit. The remote unit 14 is grounded to the locomotive carbody through plug pin c6 when the unit is installed.

Added elements of the electric control system which are within the remote unit include FR switch 16a actuated by the forward/reverse control 16 and connected through pins c7 and c10 with the reverser 32, normally open run switch 18a actuated by pressing run button 18, normally open brake off (BO) switch 19a actuated by pressing brake off button 19 and the low (main reservoir) pressure signal (light) 20 and (independent brake not set) brake signal (light) 22 previously described.

Motor Power System

Additional added elements installed in the locomotive carbody include the locomotive spotter (LSC) contactor 33 having a coil in the electric control system (FIG. 2) and normally open contacts BK 33a and FR 33b in the power system (FIG. 3). The latter system, as shown in FIG. 3, also includes normal locomotive electrical elements including (RV) reverser transfer switches RV2/R1 32a and RV3/L1 32b, (MB)motor brake transfer switches MB/R1a 34a, MB/R1b 34b and MB/L1 34c, 64 volt battery 35 and numbers 2 and 3 traction motors 36a and 36b.

The MB switches connect the motor field coils with the armatures and one another and are normally closed when the locomotive engine is shut down. The RV switches are in the reverser 32 and are operable to change the direction of current flow through the motor field coils and, thus, the direction of motor rotation and locomotive motion. When contacts BK 33a and FR 33b are closed, the 64 volt battery 35 is connected in series with the number 2 and 3 traction motors and their field coils through the MB and RV switches 34a, b, c and 32a, b to provide the motors with electric power for moving the locomotive in the direction determined by the RV switch settings.

Air System

Some major elements of the air system (FIG. 4) also have portions connected in the electric control system (FIG. 2). These include spotter magnet valve (MVSP) 37, spotter brake magnet valve (MVSB) 38 and spotter bell magnet valve (MVSBB) 39, all of which have ports 1-3 and energizing coils connected to negative conductor 28. MVSP coil 37a is fed from the negative side of NVR interlock 30 through pins c8 and c9 when the remote unit 14 is in place. MVSB coil 38a and MVSBB coil 39a are fed through pin c5 when the BO switch 19a is closed and supplied with power.

Spotter main reservoir pressure switch (SMRPS) 40 and independent brake pressure switch (IBPS) 42 have normally open interlocks 40a, 42a in series between NVR 30 negative and switches 18a (run), 19a (BO) and 16a (FR) through pin 1 of the plug 24. A rectifier 43 in series with FR switch 16a blocks any reverse feed of current from the locomotive control system circuits. In addition, normally closed interlocks 40b and 42b connect signals 20, 22 respectively through pins c3 and c4 with negative conductor 28. These signals are fed through pin c11, also from NVR 30 negative.

The air system 11 (FIG. 4) also includes the usual locomotive installed components of which there are illustrated the independent brake valve 44 having a port p20, dual ported cutout cock (DPCOC) 46, double check valve 47, H5 relay 48 with ports p9 and p11 applied optionally at customer request, brake relay valve 49 with ports p6, p16, p30 and EX, and bell valve 50. The bell, brake cylinders and main reservoir are not illustrated. Additional added items are a pressure regulator 51, two double check valves 52, 54 and various tees not numbered.

Operation

In operation, when it is desired to move a locomotive with the spotter control of the invention, the locomotive engine should be off, the main reservoir should be charged with air and the independent brake valve 44 should be set in the brake applied position to set the brakes. The operator will then plug the remote unit 14 into receptacle 26 outside the locomotive carbody so that pins c1-c11 of the plug 24 are received in sockets c1-c11 of the receptacle 26. This energizes coil 37a of valve MVSP, allowing regulated main reservoir air pressure to flow through pressure regulator 51, MVSP 37 ports p2, p3, check valve 52, MVSB 38 ports p1, p3 and check valve 47 to port EX of relay valve 49. Regulated pressure will also be delivered through optional H5 relay 48 ports p9 and p11 to port p16 of relay valve 49.

The regulated pressure at ports EX and p16 of valve 49 acts as a pilot pressure to actuate the valve 49 to supply main reservoir air through ports p6 and p30 to the brake cylinders at a pressure level corresponding to the level of regulated pilot pressure. The locomotive brakes will respond in the manner described regardless of the position of the independent brake valve 44 in the locomotive cab. This is intended as a precaution to ensure that the operator has full control of the locomotive brakes even if the independent brake valve is inadvertently moved to the release position.

Only if the locomotive engine is not running is 64 volts d.c. control voltage applied to the remote unit 14 through the normally closed no voltage NVR interlock 30 and interlocks SMRPS 40a and IBPS 42a, if closed. If the engine is running, NVR interlock 30 will be open and no power will be provided to the remote unit 14. This arrangement is to prevent inadvertent connection of the relatively low battery voltage to the high voltage of the locomotive main generator, not shown.

The SMRPS switch 40 ensures that the regulated main reservoir pressure is sufficient before power can be applied to the remote unit 14. Interlock 40a of this switch is closed by acceptable pressure levels but opens when main reservoir pressure drops to an unacceptable level. This assures that there is sufficient air pressure in the main reservoir for reliable application of the locomotive air brakes when needed. If the main reservoir pressure is below the acceptable level, SMRPS interlock 40b will be closed, lighting the low pressure signal 20 on the remote unit 14.

The IBPS switch 42 ensures that the handle (not shown) of the independent brake valve 44 in the cab of the locomotive is placed in the fully applied position before power can be applied to the remote unit 14. Interlock 42a of this switch will close at a predetermined control pressure delivered through application of the independent brake. This ensures that the brakes are applied when the operator is done with the system and unplugs the remote unit or the unit becomes unplugged for any reason during spotter operation. If the brake valve 44 is not set in the applied position, interlock 42b of the IBPS switch will be closed, lighting the brake signal 22 on the remote unit 14.

Therefore, only if the locomotive engine is dead, main reservoir pressure is sufficient and the independent brakes are applied will the remote unit 14 receive 64 volts d.c. battery control power.

In order to chose a desired direction of travel, the operator operates the forward/reverse control 16 to set the FR switch 16a and the locomotive reverser 32 for the desired direction.

To release the locomotive brakes, the brake off button 19 on the remote unit must be held down, closing BO switch 19a. This energizes valve MVSB 38 allowing the pilot pressure to exhaust from ports EX and 16 of relay valve 49 through ports p3, p2 of MVSB. The relay valve 49, in turn, cuts off the main reservoir pressure and exhausts the air from the brake cylinders, releasing the brakes.

Closing the BO switch 19a also energizes valve MVSBB 39 which actuates the bell by supplying main reservoir air through ports p2, p3 and check valve 54 to the bell ringer.

To apply power to the traction motors in order to move the locomotive, the run button 18 on the remote unit is depressed. This energizes the LSC contactor 33 which connects the locomotive batteries 35 to the number 2 and 3 traction motors 36a, b (FIG. 3), thus providing power to two axles for moving the locomotive. The run button 18 may be released and reapplied as desired to cause the locomotive to coast or accelerate in the desired direction of motion.

When the locomotive is spotted as desired or at any time during the spotting operation, the locomotive may be stopped by releasing run button 18 and brake off button 19. This disconnects battery power from the traction motors and de-energizes valve MVSB 38, allowing restoration of pilot pressure to relay valve 49 to apply the locomotive brakes.

The brake off button 19 on the remote unit 14 must be held down to release the brakes and ring the bell This ensures that the locomotive brakes will be applied to stop the locomotive if the remote unit is dropped or let go of for any reason.

After use, the remote unit 14 may be disconnected from the receptacle 26, de-energizing MVSP 37 and exhausting the regulated main reservoir pressure from the double check valve 52. The locomotive brakes will remain applied because the independent brake valve 44 is in the applied position so that it supplies control pressure through cutout DPCOC 46 and check valve 52 to the relay valve 49 as before. The locomotive brake can then be released using the cab controls if desired.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A remote spotter for a self driven vehicle having a traction motor for driving the vehicle, brakes for stopping the vehicle and an on board secondary power source separate from a primary source of traction motor power, said spotter comprising:
   auxiliary drive means for connecting the secondary power source to the traction motor for driving the vehicle,
   auxiliary brake means for applying the brakes to stop the vehicle, and
   a remote unit connectable with said vehicle auxiliary drive and brake means and normally operative upon such connection to actuate the auxiliary brake means to apply the brakes, said remote unit having first and second manually actuated self released controls, said first control being normally operative upon actuation to release the brakes and said second control being normally operative upon actuation to actuate the auxiliary drive means to move the vehicle.

2. A remote spotter as in claim 1 wherein said vehicle further includes a warning signal and said spotter further comprises signal means for also actuating the warning signal upon actuation of said first control to release the brakes.

3. A remote spotter for a self driven rail vehicle having a traction motor for driving the vehicle, air brakes for stopping the vehicle and an on board secondary power source separate from a primary source of traction motor power, said spotter comprising:
   auxiliary drive means for connecting the secondary power source to the traction motor for driving the vehicle,
   auxiliary brake means for applying the air brakes to stop the vehicle, and
   a remote unit connectable with said vehicle auxiliary drive and brake means and normally operative upon such connection to actuate the auxiliary brake means to apply the brakes, said remote unit having first and second manually actuated self released control means, said first control means being normally operative upon actuation to release the brakes and said second control means being normally operative upon actuation to actuate the auxiliary drive means to move the vehicle.

4. A remote spotter as in claim 3 wherein said rail vehicle further includes a warning bell and said spotter further comprises signal means for also actuating the warning bell upon actuation of said first control means to release the brakes.

5. A remote spotter as in claim 3 wherein said rail vehicle further includes an air system having a main reservoir connected to supply pressurized air for actuating the air brakes and said spotter further comprises first disabling means operative below a predetermined main reservoir pressure to prevent release of the brakes by actuation of said first control means.

6. A remote spotter as in claim 5 wherein said first disabling means is also operative below said predetermined main reservoir pressure to prevent actuation of the auxiliary drive means by actuation of the second control means.

7. A remote spotter as in claim 3 wherein said rail vehicle further includes independent brake means having an actuating position for causing actuation of the air brakes and said spotter further comprises second disabling means operative when the independent brake means is not in the actuating position to prevent release of the brakes and actuation of the auxiliary drive means by actuation of the first and second control means.

8. A remote spotter for a self powered rail locomotive having an engine drivingly connected to an electric power main generator, a traction motor for driving the locomotive when supplied with power from the main generator, air brakes for stopping the locomotive and an on board battery for auxiliary electric power, said spotter comprising:

auxiliary drive means for connecting the battery to the traction motor for driving the locomotive, auxiliary brake means for applying the air brakes to stop the locomotive, and a remote unit connectable with said locomotive auxiliary drive and brake means and normally operative upon such connection to actuate the auxiliary brake means to apply the brakes, said remote unit having first and second manually actuated self released control means, said first control means being normally operative upon actuation to release the brakes and said second control means being normally operative upon actuation to actuate the auxiliary drive means to move the locomotive.

9. A remote spotter as in claim 8 wherein said rail locomotive further includes a warning bell and said spotter further comprises signal means for also actuating the warning bell upon actuation of said first control means to release the brakes.

10. A remote spotter as in claim 8 wherein said rail locomotive further includes an air system having a main reservoir connected to supply pressurized air for actuating the air brakes and said spotter further comprises first disabling means operative below a predetermined main reservoir pressure to prevent release of the brakes by actuation of said first control means.

11. A remote spotter as in claim 10 wherein said first disabling means is also operative below said predetermined main reservoir pressure to prevent actuation of the auxiliary drive means by actuation of the second control means.

12. A remote spotter as in claim 11 wherein said remote unit further includes a visual signal actuated by said first disabling means to indicate a low main reservoir pressure condition.

13. A remote spotter as in claim 8 wherein said rail locomotive further includes independent brake means having an actuating position for causing actuation of the air brakes and said spotter further comprises second disabling means operative when the independent brake means is not set in the actuating position to prevent release of the brakes and actuation of the auxiliary drive means by actuation of the first and second control means.

14. A remote spotter as in claim 13 wherein said remote unit further includes a visual signal actuated by said second disabling means to indicate that the independent brake means is not set in the actuation position.

15. A remote spotter as in claim 8 wherein said rail locomotive further includes relay means for connecting battery voltage across a no power signal only when the engine is not running, said remote spotter having an electrical control system that when energized powers said remote unit, said auxiliary drive means and said auxiliary brake means, said control system being also connected for power across said no power signal such that the remote spotter is inoperative if the engine is running, thereby protecting the locomotive battery against damage due to connection with the main generator.

16. A remote spotter as in claim 8 wherein said remote unit includes an operator held control box, said first and second manually actuated self released control means comprising spring biased push buttons mounted in said control box, said control box further including a forward/reverse control movable into two positions for determining the direction of locomotive motion, a first signal light for indicating a low main reservoir pressure condition and a second signal light for indicating that the locomotive independent brake is not set in the actuating position.

* * * * *